UNITED STATES PATENT OFFICE.

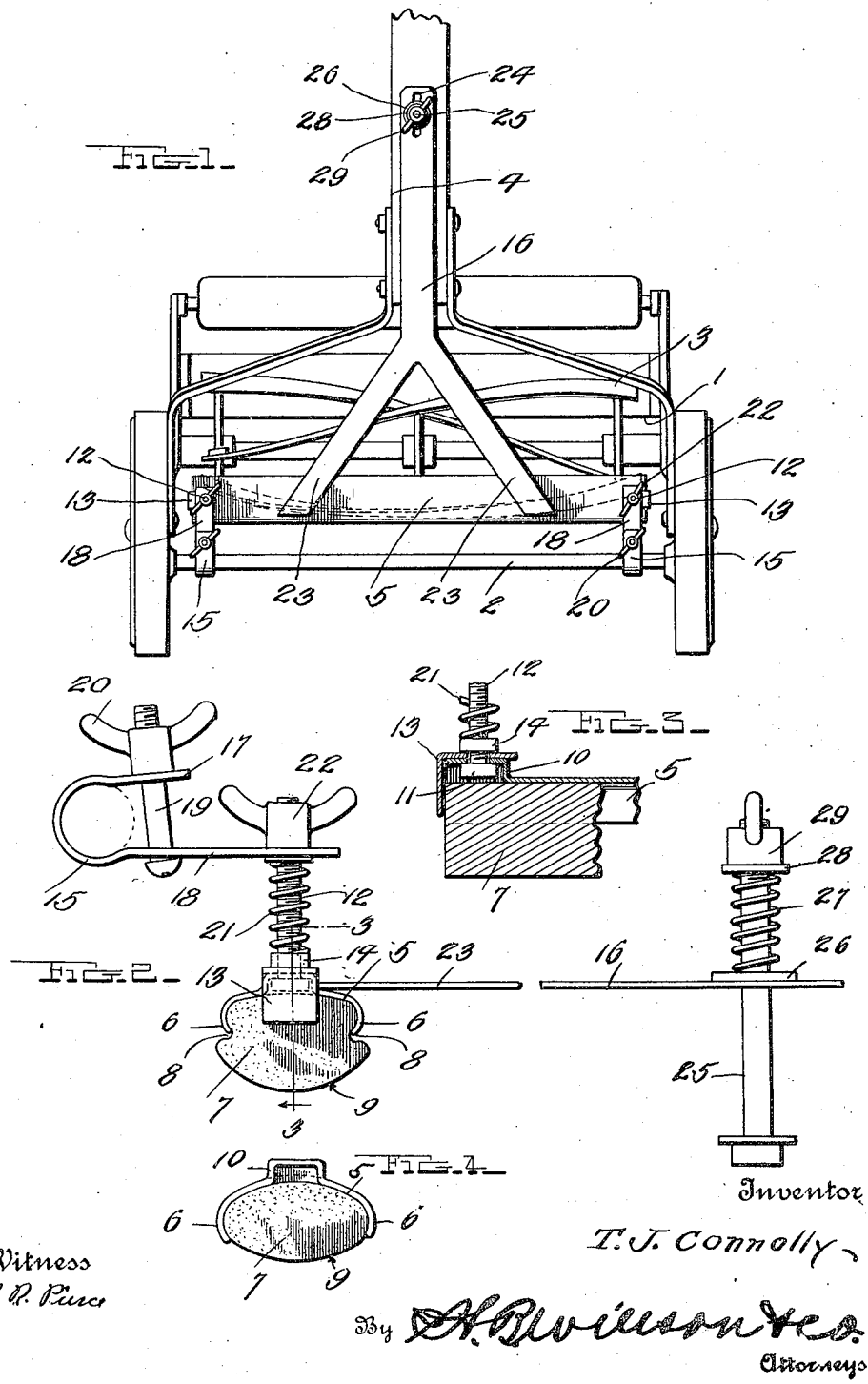

THOMAS J. CONNOLLY, OF CEDAR RAPIDS, IOWA.

LAWN-MOWER SHARPENER.

1,426,548.   Specification of Letters Patent.   Patented Aug. 22, 1922.

Application filed March 24, 1921. Serial No. 455,107.

*To all whom it may concern:*

Be it known that I, THOMAS J. CONNOLLY, a citizen of the United States, residing at Cedar Rapids, in the county of Linn and State of Iowa, have invented certain new and useful Improvements in Lawn-Mower Sharpeners; and I do declare the following to be a full, clear, and exact description of the invention, such as will enable others skilled in the art to which it appertains to make and use the same.

This invention relates to an improved lawn mower sharpener and one object of the invention is to provide a sharpener which may be connected with the frame and handle of a lawn mower and which is so constructed that it may be adjusted to bring the stone into or out of engagement with the cutting knives or blades of the lawn mower and further so constructed that when in an operative position the stone will be yieldably held in engagement with the blades and permitted to have movement toward and away from the blades so that the blades may be sharpened but at the same time the stone prevented from having too great a pressure upon the blades.

Another object of the invention is to provide a stone holder into which the stone will be slid longitudinally and to provide improved means for holding the stone against longitudinal movement out of engagement with the stone holder.

Another object of the invention is to so construct this device that the means for holding the stone in place may be mounted upon threaded bolts which connect the stone holder with clamps carried by the mower frame and further carry springs which engage these clamps and serve to yieldably hold the stone in engagement with the blades.

Another object of the invention is to provide the stone with an improved blade engaging face so constructed that the blades may move easily into engagement with the stone without touching upon the stone and further provide a blade engaging face so constructed that the blades will be easily and quickly sharpened.

This invention further provides a lawn mower sharpener so constructed that it can be easily and quickly put in place upon a lawn mower of a conventional construction thus permitting it to be used in connection with lawn mowers of the type now in use and sold either as a lawn mower attachment separate from the machine or sold applied to the machine.

This invention is illustrated in the accompanying drawings, wherein:

Figure 1 is a top plan view showing the improved sharpener carried by a lawn mower.

Figure 2 is an enlarged view showing the sharpener in elevation.

Figure 3 is a fragmentary sectional view taken along the line 3—3 of Fig. 2.

Figure 4 is a view showing a carrier and modified form of stone in end elevation.

This improved lawn mower sharpener is used in connection with a lawn mower indicated in general by the numeral 1 and provided with the usual frame construction including a cross bar or rod 2 and carrying a set of cutting blades or knives 3 and handles 4. The sharpener is provided with a stone holder 5 which is in the form of a strip having its side portions bent to provide flanges 6 for engaging the side portion of a stone 7 which will be slid longitudinally into the carrier. This stone may be constructed as shown in Fig. 2 and provided with side grooves 8 thus providing a head engaged by the stone holder or the stone may be oval as shown in Fig. 4 with the flanges 6 of the holder 5 extending about the side portions of the stone as shown. It should be noted however that in both constructions the blade engaging face 9 of the stone is convex or, in other words, arcuate in cross section so that the blades or knives 3 may easily engage the blade engaging face and move across the same when being sharpened. At the ends of this stone holder 5 pockets 10 have been provided to receive the heads 11 of the bolts 12 which bolts extend through openings in the pockets 10 as shown in Fig. 3. Cleats or plates 13 are mounted upon the bolts 12 above the pockets 10 and are secured by nuts 14 and these cleats or plates have their outer end portions extending downwardly so that they will engage the ends of the stone and thus prevent the stone from moving longitudinally out of engagement with the holder 5. It is of course understood that when the stone is put in place the securing nut of one of the cleats will be loosened so that the cleat may be moved upwardly out of the way and permit the stone to be slid into place. After the stone is in place the cleats will be returned to the position of Fig. 3 and the securing nut 14 tightened.

In order to mount the sharpener upon the bar, there has been provided clamps 15 and a shank 16 which secure the sharpener to the mower as shown in Fig. 1. Each of the clamps is formed as shown in Fig. 2 and is formed from a strip of metal bent intermediate its length for extending about the rod 2 with its end portions 17 and 18 extending rearwardly and perforated to receive a securing bolt 19 upon the upper end of which is provided a winged securing nut 20. After the clamp is in place, the securing nut will be tightened and the clamp will be secured about the rod 2. The arm or end portion 18 of the clamp is longer than the end portion 17 and is provided with an opening to receive the upper end portion of the bolt 12. A spring 21 is placed upon this bolt 12 before its upper end portion is passed through the opening of the arm 18 and the winged securing nut 22 is then put in place and tightened as much as desired. If the stone is to be held out of engagement with the knives 3, the nuts 22 will be tightened a sufficient amount to draw the bolts 12 and stone holder 5 upwardly and move the stone out of the path of travel of the blades but if it is desired to have the knives sharpened, it is simply necessary to release or loosen the nuts 22 thus permitting the springs 21 to move the stone holder downwardly and bring the stone into engagement with the blades.

The shank 16 is provided with forks or arms 23 which extend forwardly and are secured to the upper face of the stone holder 5. The rear end portion of this shank is provided with a longitudinally extending slot 24 through which extends a bolt 25. This bolt 25 passes through an opening formed in the handle 4 and after being passed through the slot 24, a washer 26, spring 27, upper washer 28 and winged securing nut 29 are put in place. The securing nut 29 is tightened as much as necessary to place the spring under sufficient tension to hold the washer 26 in close engagement with the shank 16. The shank will thus be held in engagement with the handle but at the same time will be permitted of sliding movement when the handle is moved up and down while cutting grass. It will thus be seen that the device may be connected with the lawn mower and by tightening the nuts 22 the sharpener may be held out of engagement with the blades. The lawn mower can then be used in the ordinary manner to cut the grass. If it is found that the blades need sharpening, the nuts 22 will be loosened so that the springs will move the stone holder downwardly to bend the stone into position for engagement by the blades as they revolve. The springs will hold the stone in engagement with the blades but at the same time will permit the stone holder to have movement which will prevent the stone from bearing against the blades with too great a pressure. The lawn mower will be operated in the same manner as when cutting grass and as the blades rotate they will be sharpened through engagement with the stone. As the blades rotate, they engage the curved face of the stone and slide transversely across the same and will be very quickly sharpened. After the blades have been sharpened, it is simply necessary to again tighten the nuts 22 and the stone will be drawn upwardly out of engagement with the blades. The device will therefore operate very efficiently and may be left upon the lawn mower.

I claim:

1. A lawn mower sharpener comprising a stone carrying strip for extending longitudinally of a set of cutting knives, stone engaging means at the side of said strip, a stone slidable longitudinally into and out of engagement with the stone engaging means of said strip, supporting means for said strip, and means carried by said supporting means for engaging the ends of said stone and holding the stone in engagement with the strip.

2. A lawn mower sharpener comprising a stone carrier including a strip for extending longitudinally of a set of cutting knives, said strip having inturned side flanges for engaging the sides of a stone, supporting means including rods extending from said strip and frame gripping means carried by said rods, and stops mounted upon said rods for extending over the ends of the strip and engaging the ends of a stone to hold the stone against longitudinal movement out of engagement with the strip.

3. A lawn mower sharpener comprising a stone carrier having a frame engaging element, a handle engaging element, a threaded stem carried by said stem carrier and extending through said frame engaging element, a securing nut upon said stem engaging said frame engaging element and a spring upon said stem between the stone carrier and the frame engaging element for moving the stone carrying element and yieldably holding a stone in engagement with a set of cutting knives.

4. The structure of claim 3 and means carried by the rods for engaging the end of a stone and holding the stone carried by the stem carrier in place.

5. A lawn mower sharpener comprising a stone carrier having a stone holding element, clamps for engaging a portion of a mower frame, bolts carried by the stone holder and passing through openings in said clamps and having securing nuts upon their upper ends, springs upon said bolts yieldably holding the stone holder in position for engagement of a stone by cutting blades of a mover, a shank extending from the stone holder, a bolt for extending through a mower handle and an opening in said shank, resilient means upon the bolt for holding the shank in engagement with the mower handle, and means carried by the first bolt for holding a stone in engagement with the stone holder.

In testimony whereof I have hereunto set my hand.

THOMAS J. CONNOLLY.